(12) United States Patent
Chang et al.

(10) Patent No.: US 12,252,199 B2
(45) Date of Patent: Mar. 18, 2025

(54) INDEPENDENT CORNER MODULE

(71) Applicants: Kia Corporation, Seoul (KR); Hyundai Motor Company, Seoul (KR)

(72) Inventors: Sehyun Chang, Suwon-si (KR); Sang Woo Hwang, Seoul (KR); Min Jun Kim, Busan (KR); Youngil Sohn, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 174 days.

(21) Appl. No.: 18/046,072

(22) Filed: Oct. 12, 2022

(65) Prior Publication Data

US 2023/0129358 A1  Apr. 27, 2023

(30) Foreign Application Priority Data

Oct. 27, 2021 (KR) .......................... 10-2021-0144167

(51) Int. Cl.
*B62D 7/15* (2006.01)
*B62D 7/18* (2006.01)
*B62D 7/20* (2006.01)

(52) U.S. Cl.
CPC .............. *B62D 7/1545* (2013.01); *B62D 7/18* (2013.01); *B62D 7/20* (2013.01)

(58) Field of Classification Search
CPC .......... B62D 7/1545; B62D 7/18; B62D 7/20; B62D 7/16; B62D 7/02
See application file for complete search history.

(56) References Cited

U.S. PATENT DOCUMENTS

| | | | |
|---|---|---|---|
| 6,082,720 A | 7/2000 | Ducloux et al. | |
| 2007/0045036 A1* | 3/2007 | Takeuchi | B62D 5/0418 |
| | | | 280/124.145 |
| 2013/0333966 A1* | 12/2013 | Bryant | B60K 17/30 |
| | | | 180/65.51 |
| 2019/0351932 A1* | 11/2019 | Washnock | B62D 5/0454 |

FOREIGN PATENT DOCUMENTS

| | | | | |
|---|---|---|---|---|
| CN | 102717696 B | | 4/2015 | |
| CN | 108516013 A | * | 9/2018 | ............... B62D 3/12 |
| CN | 113752821 A | * | 12/2021 | |
| JP | H02286410 A | | 11/1990 | |
| JP | 2017124822 A | * | 7/2017 | ............... B60G 3/01 |
| KR | 19910007989 Y1 | | 10/1991 | |
| KR | 1020070103191 A | | 10/2007 | |
| WO | 8704125 A1 | | 7/1987 | |

* cited by examiner

*Primary Examiner* — Zakaria Elahmadi
(74) *Attorney, Agent, or Firm* — Slater Matsil, LLP

(57) ABSTRACT

An embodiment independent corner module includes a knuckle unit positioned on an inner side surface of a wheel, a steering unit disposed to face a strut coupled to the knuckle unit, the steering unit having a center shaft configured to be fixed to a vehicle body and configured to rotate about the center shaft, a guide rail configured to define a movement path through which the steering unit rotates and moves, and a rack steering unit positioned in the steering unit, fastened to the knuckle unit, and configured to apply rotating force to the knuckle unit in response to a movement in a longitudinal direction.

20 Claims, 10 Drawing Sheets

INDEPENDENT CORNER MODULE

CROSS-REFERENCE TO RELATED APPLICATIONS

This application claims the benefit of Korean Patent Application No. 10-2021-0144167, filed on Oct. 27, 2021, which application is hereby incorporated herein by reference.

TECHNICAL FIELD

The present invention relates to an independent corner module.

BACKGROUND

In general, a suspension of a vehicle is configured to connect an axle to a vehicle body to prevent vibrations or impact, applied to the axle from the road, from being directly transferred to the vehicle body during driving of the vehicle, thereby preventing the vehicle body or luggage from being damaged and improving ride comfort.

Such a suspension may include a suspension spring for reducing impact applied from the road, a shock absorber for improving ride comfort by restraining the free vibration of the suspension spring, a stabilizer for restraining rolling of a vehicle, etc.

In general, the suspension of a commercial vehicle is mainly implemented as an integral axle suspension in which right and left wheels are connected by a single axle, and the suspension spring is mainly implemented as a reef spring or an air spring.

Meanwhile, the steering device of the commercial vehicle using the integral axle suspension includes a Pitman arm mounted on an output shaft of a steering gear to be rotatable, a drag link transferring movement of the Pitman arm to knuckle arms, the knuckle arms receiving movement of the drag link to operate a knuckle spindle, a tie rod connecting the knuckle arms on left and right sides, etc.

In a vehicle provided with the above-described integral axle suspension using an air spring and a steering device, the air spring simply serves to replace a reef spring but does not significantly contribute to improving drive comfort and handling characteristics. It is difficult for the air spring to obtain the degree of freedom of design to realize a precise geometry, due to structural characteristics of the air spring.

Moreover, recently, an independent steering suspension configured to input steering angles of wheels to respective suspensions through a motor assembly has been developed. However, in such an independent steering suspension, there has been a problem related to reliably transferring rotating force applied from the steering motor to the knuckle and the wheel. Furthermore, when only the steering unit performing large-angle steering is used, there has been a problem in that the wheel interferes with the vehicle body.

The above information disclosed in this Background section is only for enhancement of understanding of the background of the invention and accordingly it may include information that does not form the prior art that is already known to a person of ordinary skill in the art.

Korean Patent Application Publication No. 10-2007-0103191 (published on Oct. 23, 2007) provides information related to the subject matter of the present disclosure.

SUMMARY

The present invention relates to an independent corner module. Particular embodiments relate to an independent corner module configured to enable steering by collectively driving a rack motor or a steering motor depending on normal driving, parking, or performing a U turn, thereby enabling steering to be performed reliably while preventing interference with a vehicle body.

Embodiments of the present invention can solve problems associated with the related art, and an embodiment of the present invention provides an independent corner module configured to perform steering by driving a rack motor when small-angle steering is required during normal driving and perform steering by collectively driving the rack motor and/or a steering motor when large-angle steering is required as in parking or performing a U turn to enable reliable steering while preventing the interference between a wheel and a vehicle body, thereby improving driving stability.

The embodiments of the present invention are not limited to the aforementioned embodiment, and other embodiments not mentioned may be clearly understood by those with ordinary skill in the art to which the present invention pertains (hereinafter 'those skilled in the art') from the following description.

The embodiments of the present invention for achieving various features and performing characteristic functions of embodiments of the present invention to be described later are as follows below.

One embodiment of the present invention provides an independent corner module including a knuckle unit positioned on an inner side surface of a wheel, a steering unit disposed to face a strut coupled to the knuckle unit, having a center shaft thereof being fixed to a vehicle body, and configured to rotate about the center shaft, a guide rail defining a movement path through which the steering unit rotates and moves, and a rack steering unit positioned in the steering unit, fastened to the knuckle unit, and configured to apply rotating force to the knuckle unit in response to movement in a longitudinal direction.

The steering unit may include a body having one end portion fixed by the center shaft and the other end portion rail-coupled to the guide rail, and configured to reciprocally rotate along the guide rail, a drive motor coupled to the body and configured to apply driving force by which the other end portion of the body rotates and moves along the guide rail, and a drive gear configured to rotate in response to operation of the drive motor and allow the body to move along the guide rail.

Furthermore, the steering unit may further include a plurality of roller bearings connecting the body and the guide rail, the roller bearings being configured to support a load input to the wheel in a lateral direction and a front-back direction.

The guide rail may include a guide rail gear provided on an inner circumferential surface, the guide rail gear engaging with the drive gear, and may guide the body to be rotatable and movable about the center shaft in response to rotation of the drive gear.

The guide rail may be configured in a shape of an arc.

The rack steering unit may include a rack motor coupled to the steering unit and a rack rod fastened adjacently to the knuckle unit, the length of the rack rod being varied by driving force of the rack motor.

The rack steering unit may be eccentrically fastened to the knuckle unit, and the knuckle unit is configured to rotate as the length of the rack rod is varied.

Here, the independent corner module according to embodiments of the present invention may further include a pair of lower link units connecting the knuckle unit and the steering unit, and each being configured to pivot in response to the varying of the length of the rack rod to support rotation of the knuckle unit.

Furthermore, the independent corner module according to embodiments of the present invention may further include a first king pin shaft configured by connecting an upper support point of the strut and a virtual center point which an extension of the lower link unit faces and a second king pin shaft configured by connecting an intersection of the vehicle body having the fixed center shaft and the center point and a center of rotation of the guide rail along which the steering unit rotates and moves.

According to embodiments of the present invention, it is possible to perform steering by driving the rack motor when small-angle steering is required during normal driving and perform steering by collectively driving the rack motor and/or the steering motor when large-angle steering is required as in parking or performing a U turn. Consequently, it is possible to enable reliable steering while preventing the interference between the wheel and the vehicle body, thereby improving driving stability.

Furthermore, according to embodiments of the present invention, it is possible to perform both large-angle steering and small-angle steering about the first king pin shaft and the second king pin shaft. When all of the wheels including the knuckle unit are operated to rotate 90°, it is possible to park the vehicle by turning the vehicle 90°, thereby improving parking convenience. It is also possible to minimize the radius of rotation of the wheels.

The effects of embodiments of the present invention are not limited to the aforementioned effects, and other effects not mentioned may be clearly recognized by those skilled in the art from the following description.

BRIEF DESCRIPTION OF THE DRAWINGS

The above and other features of embodiments of the present invention will now be described in detail with reference to certain exemplary examples thereof illustrated in the accompanying drawings which are given herein below by way of illustration only, and thus are not limitative of the present invention, and wherein.

DETAILED DESCRIPTION OF ILLUSTRATIVE EMBODIMENTS

Hereinafter, example embodiments of the present invention will be described in detail with reference to the accompanying drawings.

The above and other advantages and features of embodiments of the present invention, as well as methods of realizing the same, will be more clearly understood from the following detailed description of embodiments when taken in conjunction with the accompanying drawings.

However, the present invention is not limited to specific embodiments to be described hereinafter but may be embodied in a variety of different forms. Rather, these embodiments are provided so that the description of the present invention will be complete and will fully convey the scope of the present invention to those skilled in the technical field to which the present invention pertains. The present invention shall be defined by the scope of the claims.

Further, in the following description of the present invention, a detailed description of known technology or the like will be omitted in the situation in which the subject matter of the present invention may be rendered rather unclear thereby.

Figure 1:
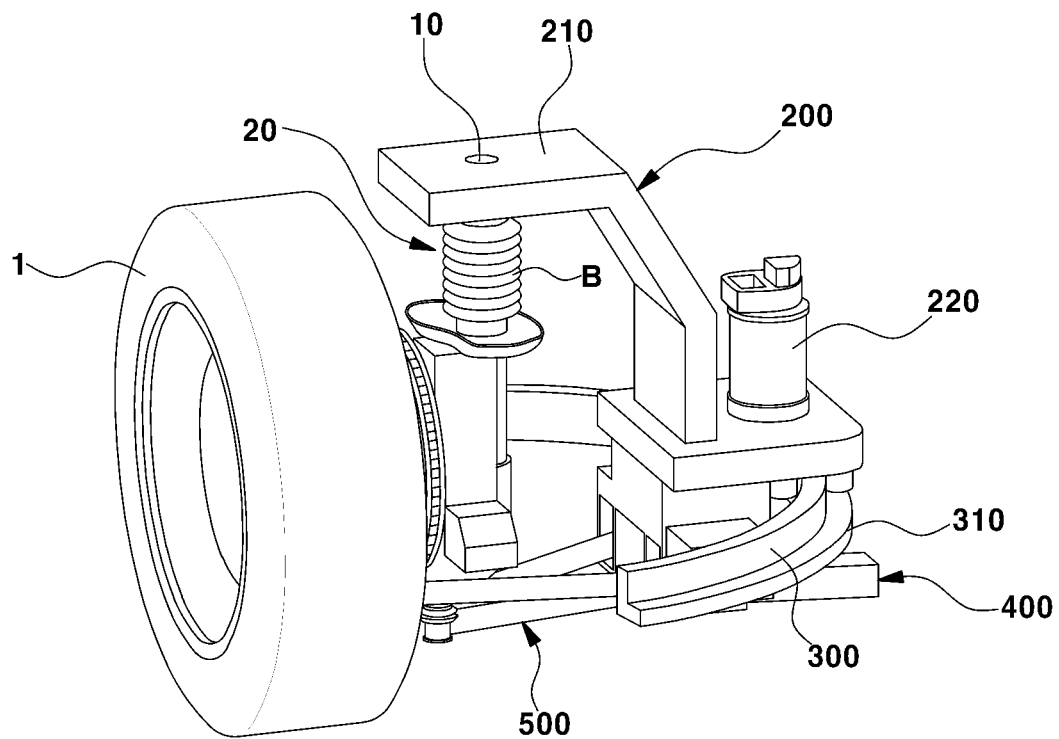
FIG. 1 is a view schematically illustrating a structure of an independent corner module according to embodiments of the present invention.
Figure 2:
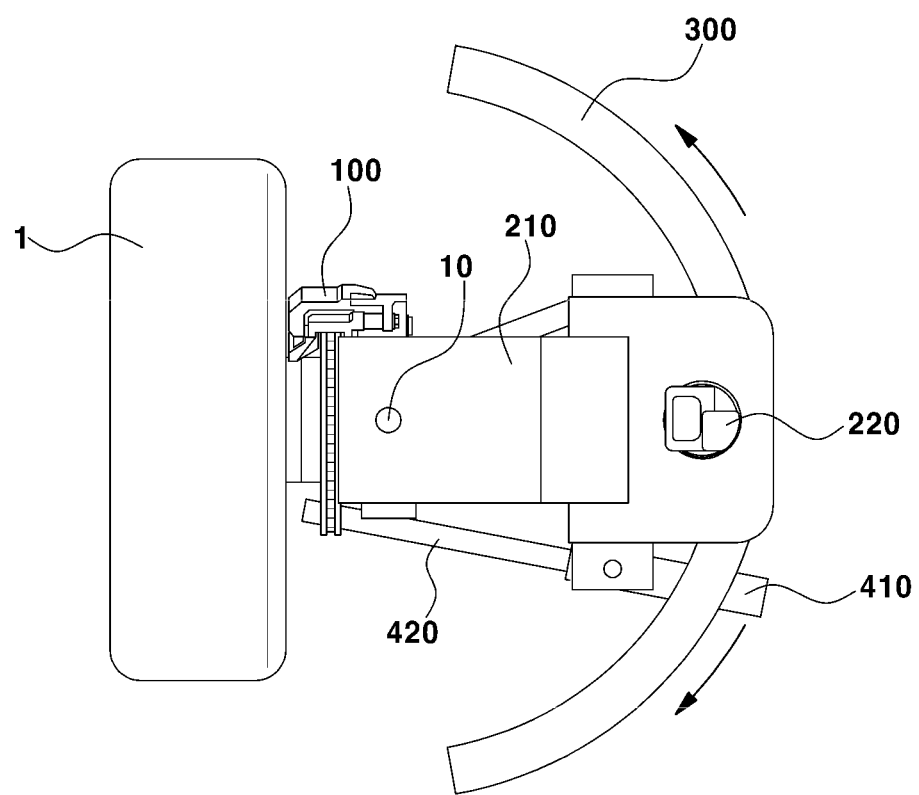
FIG. 2 is a view illustrating a guide rail for the independent corner module according to embodiments of the present invention.
Figure 3:
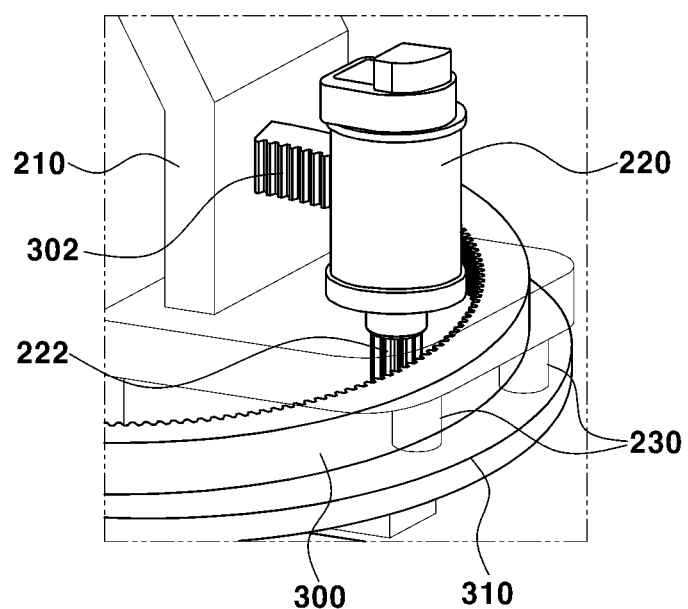
FIG. 3 is a view illustrating a roller bearing for the independent corner module according to embodiments of the present invention.

FIG. 1 is a view schematically illustrating a structure of an independent corner module according to embodiments of the present invention, FIG. 2 is a view illustrating a guide rail for the independent corner module according to embodiments of the present invention, and FIG. 3 is a view illustrating a roller bearing for the independent corner module according to embodiments of the present invention.

Figure 4:
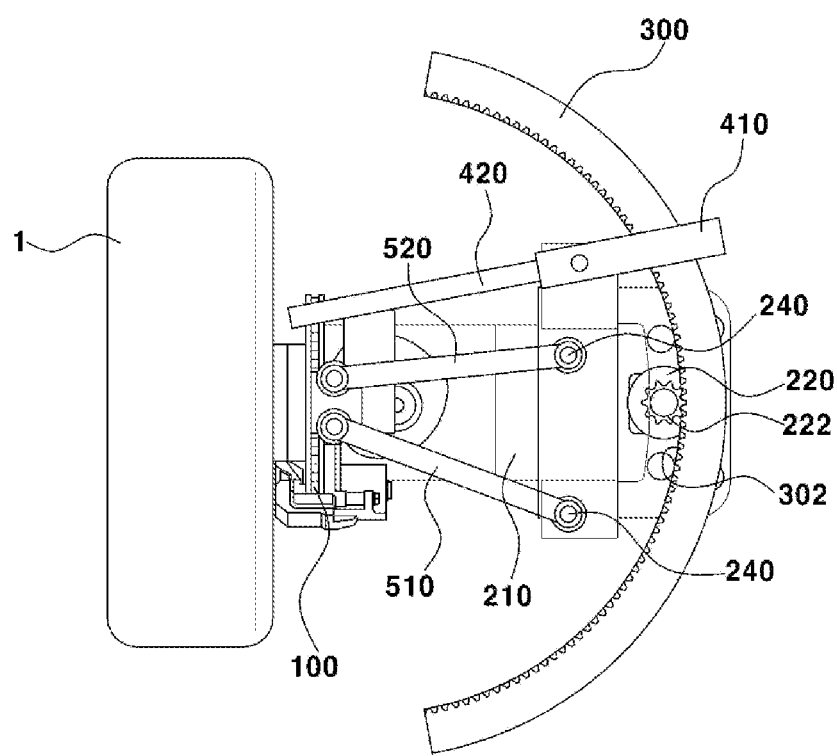
FIG. 4 is a view illustrating a lower link unit for the independent corner module according to embodiments of the present invention.
Figure 5:
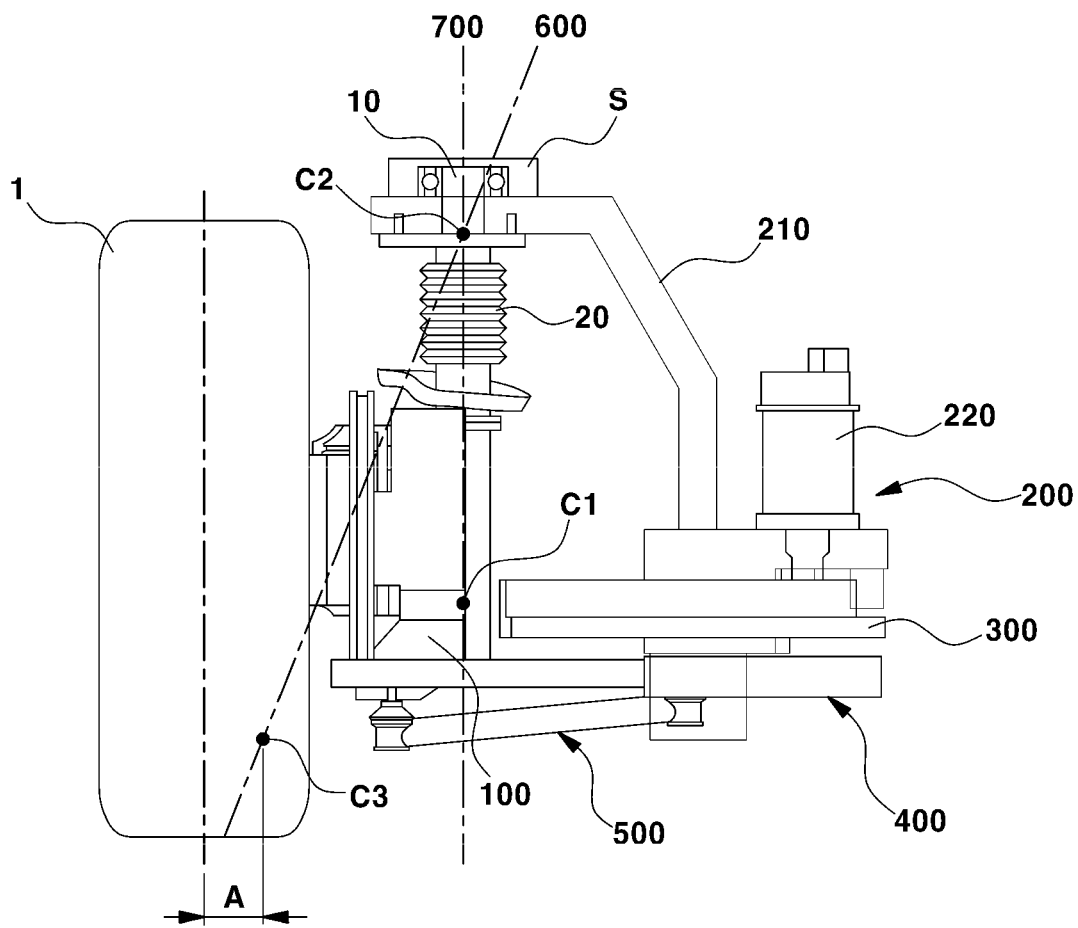
FIG. 5 is a view illustrating a first king pin shaft and a second king pin shaft for the independent corner module according to embodiments of the present invention.
Figure 6:
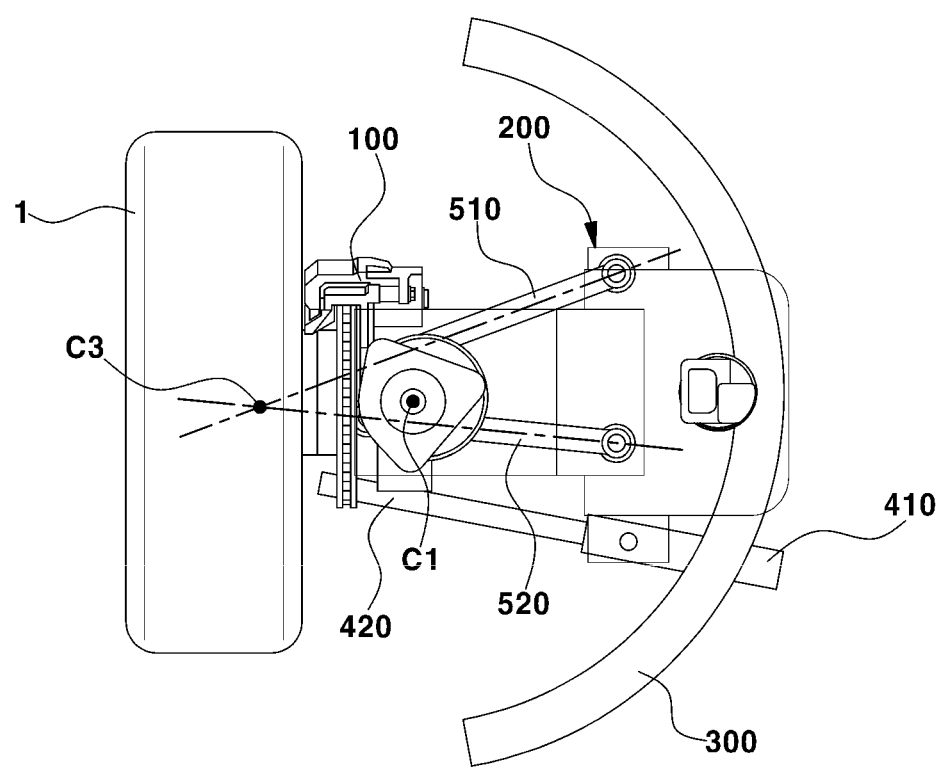
FIG. 6 is a view illustrating a virtual center point for small-angle steering for the independent corner module according to embodiments of the present invention.

FIG. 4 is a view illustrating a lower link unit for the independent corner module according to embodiments of the present invention, FIG. 5 is a view illustrating a first king pin shaft and a second king pin shaft for the independent corner module according to embodiments of the present invention, and FIG. 6 is a view illustrating a virtual center point for small-angle steering for the independent corner module according to embodiments of the present invention.

Figure 7A:
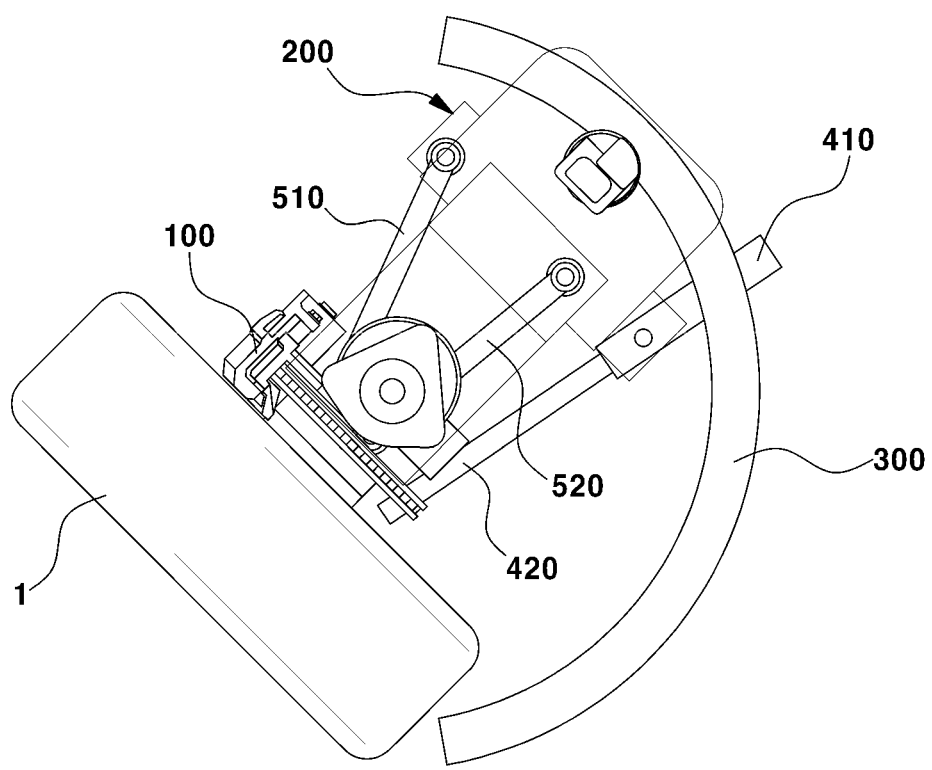
FIGS. 7A and 7B are views illustrating a first embodiment of driving for the independent corner module according to embodiments of the present invention.
Figure 7B:
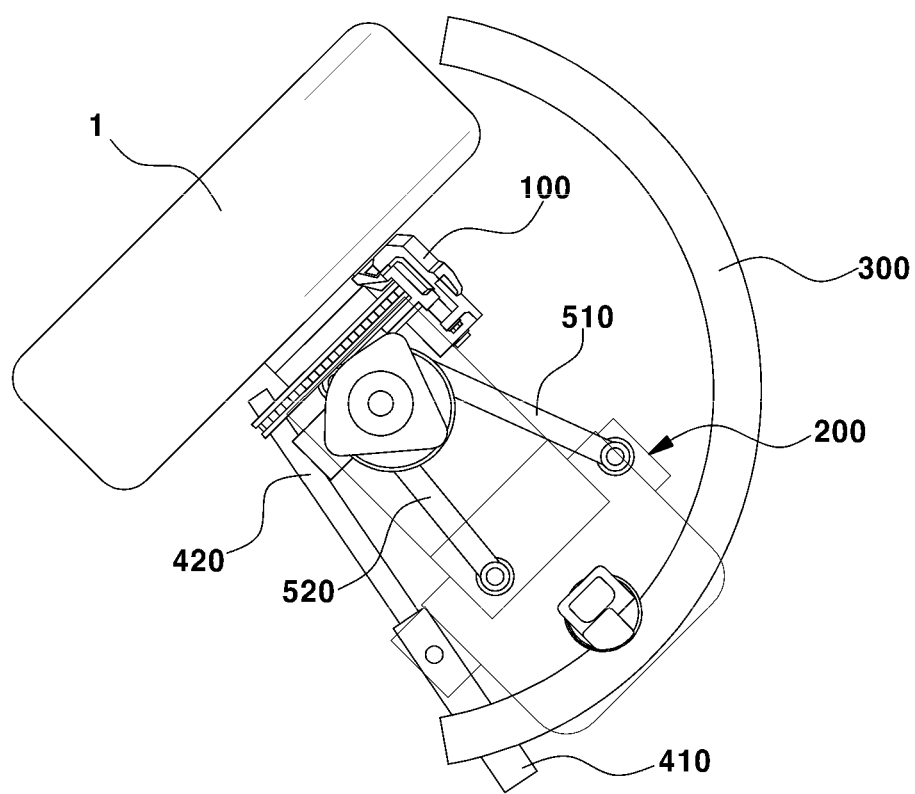
Figure 8A:
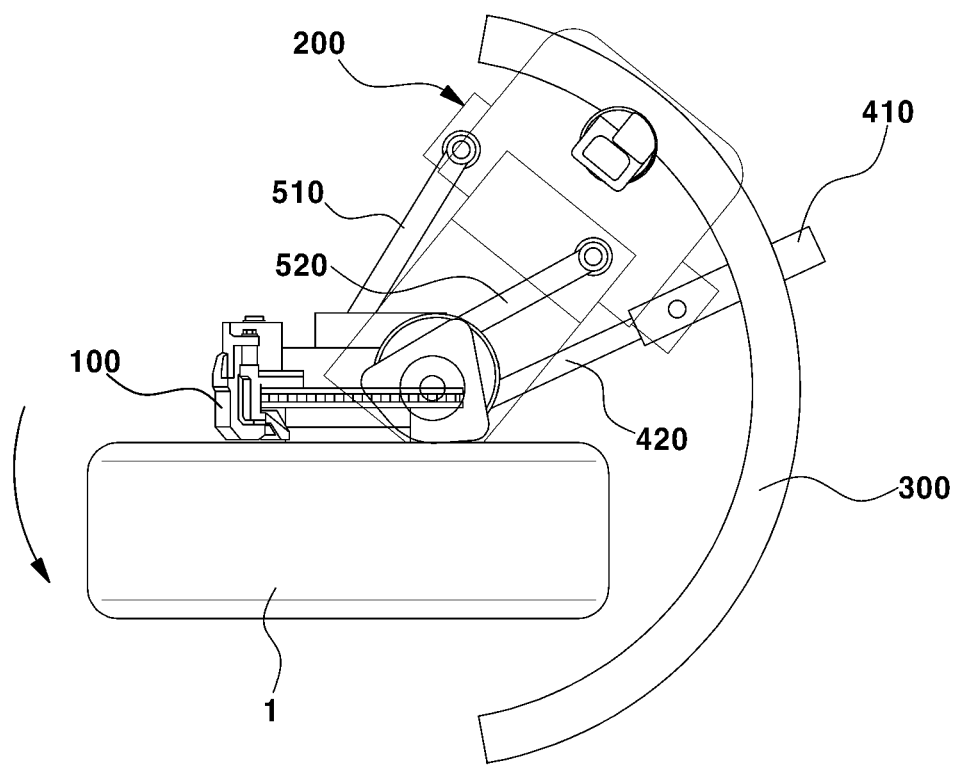
FIGS. 8A and 8B are views illustrating a second embodiment of driving for the independent corner module according to embodiments of the present invention.
Figure 8B:
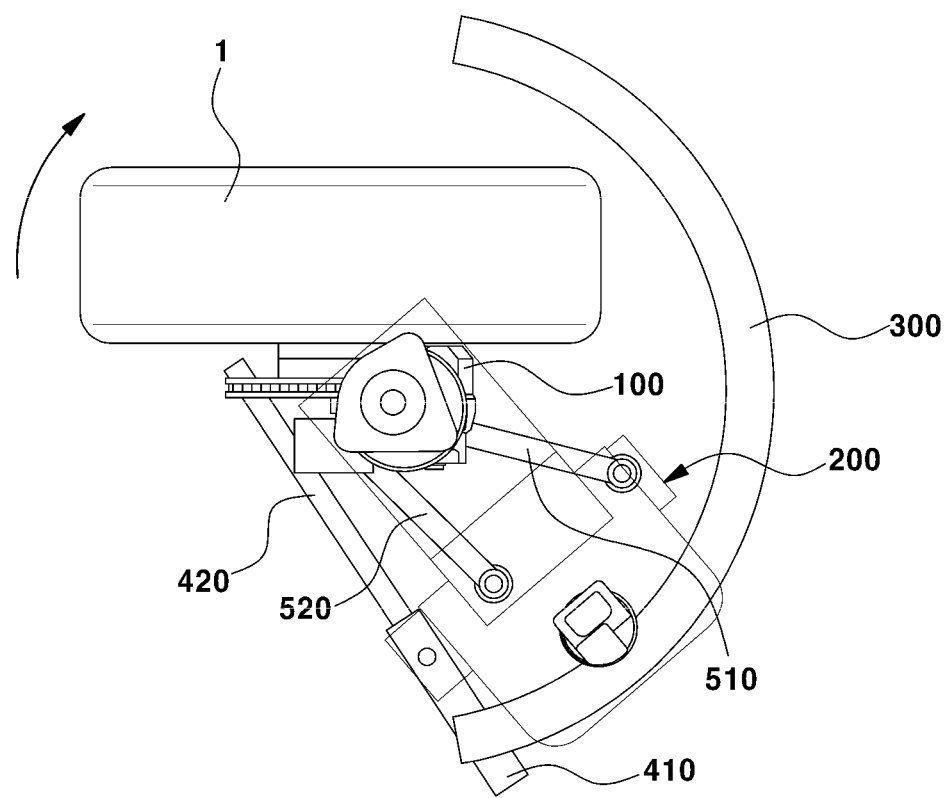

FIGS. 7A and 7B are views illustrating a first embodiment of driving for the independent corner module according to embodiments of the present invention, and FIGS. 8A and 8B are views illustrating a second embodiment of driving for the independent corner module according to embodiments of the present invention.

In general, a constant velocity joint is used for power transfer between a differential gear and a wheel in a vehicle. A module including not only this constant velocity joint, but also a plurality of parts connecting the differential gear and the wheel, and surrounding portions, may be defined as a corner module.

The independent corner module based thereon according to the present embodiment includes a knuckle unit 100, a steering unit 200, a guide rail 300, and a rack steering unit 400, as illustrated in FIG. 1.

The knuckle unit 100 is positioned on the inner side surface of a wheel 1, and is substantially connected to a vehicle steering system (not shown).

Furthermore, the steering unit 200 is disposed to face a strut 20 coupled to the knuckle unit 100, and is configured to be rotatable about a center shaft 10 in a state in which the steering unit 200 is coupled to a vehicle body S by the center shaft 10. That is, specifically described with reference to FIG. 5, the steering unit 200 is configured to be rotatable about a second king pin shaft 700 formed by connecting the center shaft 10 and the center of rotation C1 of the guide rail 300, about which the steering unit 200 rotates and moves, in a vertical direction.

Here, when the wheel is steered along with pivoting of the knuckle unit 100, the strut 20 rotates together with the knuckle unit 100. Since the upper end portion of the strut 20 is coupled to one end portion of the steering unit 200, which is coupled to the vehicle body S by the center shaft 10, the strut 20 may also be configured to be rotatable relative to the vehicle body S.

Furthermore, the strut 20 includes a shock absorber, and includes a spring B together with the shock absorber. The strut 20 may also serve to absorb and reduce vibrations or impact transferred to the vehicle body S through the wheel.

Meanwhile, the steering unit 200 is configured such that the position thereof is fixed in the vehicle body S. Along with provision of a bearing, the steering unit 200 is axially rotatable on the vehicle body S about the center shaft 10. The steering unit 200 includes a body 210, a drive motor 220, and a drive gear 222.

The body 210 is configured such that one end portion thereof is axially coupled to the vehicle body S by the center shaft 10 and the other end portion thereof is rail-coupled to the guide rail 300. In this state, the body 210 is reciprocally rotatable along the guide rail 300.

That is, one end portion of the body 210 is disposed to be axially rotatable on the vehicle body S by the bearing to support vertical force acting in a top-bottom direction. Furthermore, the other end portion of the body 210 supports side force and front-back force while rotating and moving along the guide rail 300.

Furthermore, the drive motor 220 is coupled to the body 210, and is configured to apply a driving force by which the other end of the body 210 rotates and moves along the guide rail 300.

More specifically, as illustrated in FIGS. 3 and 4, the drive gear 222 is provided on the lower end portion of the drive motor 220. As the drive motor 220 is started, the drive gear 222 may rotate, in other words, the drive gear 222 may rotate while in engagement with a guide rail gear 302 provided on the inner circumferential surface of the guide rail 300, thereby causing the body 210 to reciprocate along the guide rail 300.

Thus, when driving force is applied through the drive motor 220, the body 210 moves along the guide rail 300 provided in the shape of an arc about the center shaft 10, as illustrated in FIG. 2. At this time, the strut 20 is fixedly coupled to one end portion of the body 210. Consequently, as the body 210 rotates and moves along the guide rail 300, the knuckle unit 100 and the wheel 1 coupled to the strut 20 may be steered.

Here, the steering unit 200 may further include a roller bearing 230. The roller bearing 230 may be a plurality of roller bearings 230 connecting the body 210 and the guide rail 300 as illustrated in FIG. 3.

More specifically, the roller bearing 230 is disposed between a stepped portion 310 of the guide rail 300 and the other end portion of the body 210 to facilitate the rotation and movement of the body 210 about the guide rail 300. Thus, during the rotation and movement of the body 210, the roller bearing 230 may support a pressure load applied in the lateral direction and the front-back direction of the wheel 1.

Furthermore, the guide rail 300 is configured to form a movement path for the rotation and movement of the steering unit 200 about the center shaft 10. The guide rail 300 is provided in the shape of an arc having a predetermined length. For large-angle steering for the entire wheel 1 including the knuckle unit 100 as in a specific situation, e.g., parking or performing a U turn, as the drive motor 220 is started and the body 210 rotates and moves about the second king pin shaft 700, the guide rail 300 allows the wheel 1 including the knuckle unit 100 to be steered at a relatively large angle.

Furthermore, as illustrated in FIG. 4, the rack steering unit 400 is positioned below the steering unit 200 to be eccentrically fastened to the knuckle unit 100 and, in response to movement in the longitudinal direction, applies rotating force to the knuckle unit 100.

In this regard, the rack steering unit 400 includes a rack motor 410 and a rack rod 420.

The rack motor 410 is fixedly coupled to the lower portion of the steering unit 200.

Furthermore, the rack rod 420 is fastened adjacent to the knuckle unit 100, and is configured such that the length thereof is varied by the driving force of the rack motor 410.

Consequently, the rack steering unit 400 is eccentrically fastened to the knuckle unit 100 and is configured such that the length of the rack rod 420 is varied when the rack motor 410 is started, thereby allowing the knuckle unit 100 to rotate.

That is, the independent corner module according to the present embodiment further includes a lower link unit 500 positioned below the steering unit 200 and connecting the knuckle unit 100 and the steering unit 200, as illustrated in FIG. 4. More specifically, the lower link unit 500 includes a front lower link 510 and a rear lower link 520. The lower link unit 500 is configured to be pivot-supported at a coupling position below the knuckle unit 100 and the positions of mounting brackets 240 provided below the steering unit 200 to pivot along with variation in the length of the rack rod 420. Thus, when the length of the rack rod 420 is varied by the driving of the rack motor 410, the lower link unit 500 supports the rotation of the knuckle unit 100 for small-angle steering.

Meanwhile, as illustrated in FIGS. 5 and 6, a first king pin shaft 600 is configured by connecting an upper support point C2 of the strut 20 and a virtual center point C3 which an extension of the lower link unit 500 faces. For small-angle steering for the wheel 1 including the knuckle unit boo along the first king pin shaft 600, for example, in a normal driving situation, as the rack motor 410 is started, the knuckle unit 100 rotates and moves about the first king pin shaft 600, thereby allowing the wheel 1 to be steered at a relatively small steering angle.

The first king pin shaft 600 may be defined as a shaft extending through the upper support point C2 of the strut 20 and the virtual center point C3 in a typical MacPherson suspension structure. The first king pin shaft 600 is set such that a wheel offset amount A on the road is relatively reduced (see FIG. 5). Thus, during braking, the obtuseness of feeling to rotational moment of the first king pin shaft 600 caused by braking force or disturbance, such as kickback, caused by external force transferred from the road may be increased, thereby improving driving stability.

The operating states of the above-described configuration of the independent corner module according to the present embodiment will be described hereinafter with reference to FIGS. 7A to 8B.

As illustrated in FIGS. 7A and 7B, for example, in a situation in which the body 210 is rotatably coupled to the vehicle body S through the center shaft 10, as the drive motor 220 is started in a specific situation, such as parking or performing a U turn, the entire steering unit 200 including the body 210 and the drive motor 220 rotates and moves about the second king pin shaft 700. Consequently, the entire wheel 1 including the knuckle unit 100 may be steered at a relatively large steering angle corresponding to large-angle steering.

In this operating state, as illustrated in FIGS. 8A and 8B, as the rack steering unit 400 is started, when the knuckle unit 100 rotates in one direction or the other direction, i.e., at a relatively small steering angle, the entire wheel 1 rotates at a steering angle corresponding to 90° in a situation in which large-angle steering has been accomplished.

For example, in a situation in which large-angle steering in the left direction has been accomplished (see FIG. 7A), the length of the rack rod 420 is reduced by the rack motor 410, and the knuckle unit 100 eccentrically coupled to the rack rod 420 additionally rotates in the left direction. Here, the angles of the rear lower link 520 and the front lower link 510 are also varied on the mounting brackets 240, respectively, to support pivot-rotation of the knuckle unit 100 (see FIG. 4). Consequently, the wheel 1 including the knuckle unit 100 is steered at a small angle in the left direction about the virtual center point C3 (see FIG. 6), thereby finally rotating to a steering angle corresponding to 90°.

Thus, in a vehicle in which the independent corner module is used, when all of the wheels 1 including the knuckle unit 100 are rotated 90°, it is possible to park the vehicle by turning the vehicle 90°, thereby improving parking convenience. Furthermore, this structure can minimize the radius of rotation of the wheel 1.

As a result, in the independent corner module according to the present embodiment, the steering unit 200 and the rack steering unit 400 can be rotated about the first king pin shaft 600 and the second king pin shaft 700, respectively, so that small-angle steering and large-angle steering can be controlled in a combined manner. In comparison with the MacPherson strut suspension structure of the related art, the protruding strut is removed from the independent corner module according to the present embodiment. Consequently, the independent corner module can improve product competitiveness while having a compact structure.

According to embodiments of the present invention, it is possible to perform steering by driving the rack motor when small-angle steering is required during normal driving and perform steering by collectively driving the rack motor and/or the steering motor when large-angle steering is required as in parking or performing a U turn. Consequently, it is possible to enable reliable steering while preventing the interference between the wheel and the vehicle body, thereby improving driving stability.

Furthermore, according to embodiments of the present invention, it is possible to perform both large-angle steering and small-angle steering about the first king pin shaft and the second king pin shaft. When all of the wheels including the knuckle unit are operated to rotate 90°, it is possible to park the vehicle by turning the vehicle 90°, thereby improving parking convenience. It is also possible to minimize the radius of rotation of the wheels.

Although some embodiments have been provided to illustrate the present invention in conjunction with the accompanying drawings, it will be apparent to those skilled in the art that the embodiments are provided for illustrative purposes only, and that various modifications and alterations can be made without departing from the spirit and scope of the present invention. It should also be understood that the entirety or some of the foregoing embodiments may be selectively combined. Accordingly, the true scope and spirit of the present invention shall be defined only by the appended claims.

What is claimed is:

1. An independent corner module comprising:
    a knuckle unit fixed on a wheel;
    a strut having a first end portion connected to the knuckle unit;
    a steering unit connected to a second end portion of the strut, the steering unit having a center shaft configured to rotate about the center shaft;
    a guide rail configured to define a movement path through which the steering unit rotates and moves; and
    a rack steering unit having a first end portion fixed on the steering unit and a second end portion connected to the knuckle unit, and configured to apply rotating force to the knuckle unit.

2. The independent corner module of claim 1, wherein the steering unit comprises:
    a body having a first end portion fixed by the center shaft and a second end portion rail-coupled to the guide rail, the body being configured to reciprocally rotate along the guide rail;
    a drive motor coupled to the body and configured to apply driving force by which the second end portion of the body rotates and moves along the guide rail; and
    a drive gear configured to rotate in response to operation of the drive motor and to allow the body to move along the guide rail.

3. The independent corner module of claim 2, wherein the steering unit further comprises a plurality of roller bearings connecting the body and the guide rail, the roller bearings being configured to support a load input to the wheel in a lateral direction and a front-back direction.

4. The independent corner module of claim 2, wherein the guide rail comprises a guide rail gear provided on an inner circumferential surface, the guide rail gear configured to engage with the drive gear and to guide the body to be rotatable and movable about the center shaft in response to rotation of the drive gear.

5. The independent corner module of claim 2, wherein the rack steering unit comprises:
    a rack motor coupled to the steering unit; and
    a rack rod fastened adjacently to the knuckle unit, wherein a length of the rack rod is configured to be varied by a driving force of the rack motor.

6. The independent corner module of claim 5, wherein the rack steering unit is eccentrically fastened to the knuckle unit and the knuckle unit is configured to rotate as the length of the rack rod is varied.

7. The independent corner module of claim 6, further comprising a pair of lower link units connecting the knuckle unit and the steering unit, each of the lower link units being configured to pivot in response to varying of the length of the rack rod to support rotation of the knuckle unit.

8. The independent corner module of claim 7, further comprising:
    a first king pin shaft configured by connecting an upper support point of the strut and a virtual center point that an extension of the lower link unit faces; and
    a second king pin shaft configured by connecting an intersection of a vehicle body having a fixed center shaft and the virtual center point and a center of rotation of the guide rail along which the steering unit is configured to rotate and move.

9. The independent corner module of claim 1, wherein the guide rail is in a shape of an arc.

10. An independent corner module comprising:
a knuckle unit fixed on a wheel;
a strut having a first end portion connected to the knuckle unit;
a steering unit connected to a second end portion of the strut, the steering unit having a center shaft configured to rotate about the center shaft;
a guide rail configured to define a movement path through which the steering unit rotates and moves; and
a rack steering unit having a first end portion fixed on the steering unit and a second end portion connected to the knuckle unit, and configured to apply rotating force to the knuckle unit, wherein the rack steering unit comprises:
a rack motor coupled to the steering unit; and
a rack rod fastened adjacently to the knuckle unit, wherein a length of the rack rod is configured to be varied by a driving force of the rack motor.

11. The independent corner module of claim 10, wherein the rack steering unit is eccentrically fastened to the knuckle unit, and the knuckle unit is configured to rotate as the length of the rack rod is varied.

12. The independent corner module of claim 11, further comprising a pair of lower link units connecting the knuckle unit and the steering unit, each of the lower link units being configured to pivot in response to varying of the length of the rack rod to support rotation of the knuckle unit.

13. The independent corner module of claim 12, further comprising:
a first king pin shaft configured by connecting an upper support point of the strut and a virtual center point that an extension of the lower link unit faces; and
a second king pin shaft configured by connecting an intersection of a vehicle body having the fixed center shaft and the virtual center point and a center of rotation of the guide rail along which the steering unit is configured to rotate and move.

14. A method of providing an independent corner module, the method comprising:
fixing a knuckle unit on a wheel;
connecting a first end portion of a strut to the knuckle unit;
connecting a steering unit to a second end portion of the strut, the steering unit having a center shaft fixed to a vehicle body and rotatable about the center shaft;
providing a guide rail that defines a movement path through which the steering unit rotates and moves; and
fixing a rack steering unit on the steering unit and a second end connected to the knuckle unit, wherein the rack steering unit is configured to apply force to the knuckle unit.

15. The method of claim 14, wherein the steering unit comprises:
a body having a first end portion fixed by the center shaft and a second end portion rail-coupled to the guide rail, the body reciprocally rotatable along the guide rail;
a drive motor coupled to the body, wherein the drive motor applies a driving force by which the second end portion of the body rotates and moves along the guide rail; and
a drive gear that rotates in response to operation of the drive motor and allows the body to move along the guide rail.

16. The method of claim 15, wherein the steering unit further comprises a plurality of roller bearings connecting the body and the guide rail, the roller bearings supporting a load input to the wheel in a lateral direction and a front-back direction.

17. The method of claim 15, wherein the guide rail comprises a guide rail gear provided on an inner circumferential surface, and wherein the guide rail gear engages with the drive gear and guides the body to be rotatable and movable about the center shaft in response to rotation of the drive gear.

18. The method of claim 14, wherein the rack steering unit comprises:
a rack motor coupled to the steering unit; and
a rack rod fastened adjacently to the knuckle unit, wherein a length of the rack rod is varied by a driving force of the rack motor.

19. The method of claim 18, wherein the rack steering unit is eccentrically fastened to the knuckle unit and the knuckle unit rotates as the length of the rack rod is varied.

20. The method of claim 14, wherein the guide rail is in a shape of an arc.

* * * * *

UNITED STATES PATENT AND TRADEMARK OFFICE
CERTIFICATE OF CORRECTION

PATENT NO. : 12,252,199 B2
APPLICATION NO. : 18/046072
DATED : March 18, 2025
INVENTOR(S) : Chang et al.

Page 1 of 1

It is certified that error appears in the above-identified patent and that said Letters Patent is hereby corrected as shown below:

In the Claims

In Column 9, in Claim 13, Line 34, delete "fixed center" and insert -- center --.

Signed and Sealed this
Twenty-second Day of April, 2025

Coke Morgan Stewart
*Acting Director of the United States Patent and Trademark Office*